(12) United States Patent
Kimura et al.

(10) Patent No.: US 8,048,533 B2
(45) Date of Patent: Nov. 1, 2011

(54) PAPER SEAL, SEALING METHOD, AND SEALED ARTICLE

(75) Inventors: Kazuyuki Kimura, Ibaraki (JP); Hiromitsu Tamauchi, Chiba (JP); Ryouichi Uchino, Ibaraki (JP)

(73) Assignee: Yupo Corporation, Tokyo (JP)

( * ) Notice: Subject to any disclaimer, the term of this patent is extended or adjusted under 35 U.S.C. 154(b) by 97 days.

(21) Appl. No.: 12/521,310

(22) PCT Filed: Dec. 28, 2007

(86) PCT No.: PCT/JP2007/001493
§ 371 (c)(1),
(2), (4) Date: Sep. 28, 2009

(87) PCT Pub. No.: WO2008/084522
PCT Pub. Date: Jul. 17, 2008

(65) Prior Publication Data
US 2010/0126991 A1    May 27, 2010

(30) Foreign Application Priority Data

Dec. 28, 2006 (JP) ................................. 2006-355752

(51) Int. Cl.
*B32B 5/16* (2006.01)
(52) U.S. Cl. ............. 428/537.5; 428/143; 428/172; 428/212; 428/316.6; 428/326
(58) Field of Classification Search ............ 428/143, 428/172, 212, 316.6, 326, 537.5
See application file for complete search history.

(56) References Cited

U.S. PATENT DOCUMENTS

| 6,086,987 | A | 7/2000 | Yamanaka et al. | |
| 6,534,150 | B1 * | 3/2003 | Yamanaka et al. | ............ 428/143 |
| 2002/0160170 | A1 | 10/2002 | Ishige et al. | |
| 2004/0023023 | A1 | 2/2004 | Ishige et al. | |
| 2005/0186371 | A1 | 8/2005 | Kimura et al. | |
| 2008/0108744 | A1 | 5/2008 | Ishige et al. | |
| 2009/0169780 | A1 | 7/2009 | Kimura et al. | |

FOREIGN PATENT DOCUMENTS

| EP | 1097805 | 5/2001 |
| EP | 1219412 | 7/2002 |
| EP | 1340783 | 9/2003 |
| JP | 55-44729 | 3/1980 |
| JP | 55-98708 | 7/1980 |
| JP | 56-151672 | 11/1981 |
| JP | 02-032567 | 9/1990 |
| JP | 05-305976 | 11/1993 |
| JP | 06-239375 | 8/1994 |
| JP | 7-300568 | 11/1995 |
| JP | 10-212367 | 8/1998 |
| JP | 11-348192 | 12/1999 |
| JP | 2002-370772 | 12/2002 |
| JP | 2004-068017 | 3/2004 |

OTHER PUBLICATIONS

U.S. Appl. No. 12/704,552 to Kimura et al., filed Feb. 12, 2010.
International Preliminary Report on Patentability including the Written Opinion of the International Searching Authority for PCT/JP2007/001493.
International Search Report of the International Searching Authority for PCT/JP2007/001493.
Search report from E.P.O. that issued with respect to European Patent Application No. 07859678.0, mail date is Jun. 22, 2011.

* cited by examiner

*Primary Examiner* — Leszek Kiliman
(74) *Attorney, Agent, or Firm* — Greenblum & Bernstein, PLC

(57) ABSTRACT

A paper seal comprising a stretched thermoplastic resin film that comprises (a) a surface layer, (b) a substrate layer, and (c) a water-based adhesive-receiving layer having a water absorption level of from 2 to 25 ml/m$^2$, wherein the stretched thermoplastic resin film has a porosity of from 20 to 50% and a 120°-opening time by bending repulsion of from 20 to 70 seconds. The paper seal can be stuck in a flat state without being curled by the environmental influence during labeling or by the influence of seasonal variation, and can be peeled off completely.

10 Claims, No Drawings

PAPER SEAL, SEALING METHOD, AND SEALED ARTICLE

TECHNICAL FIELD

The present invention relates to a paper seal to be stuck to an opening of an article, a sealing method with the paper seal, and a sealed article of which the opening has been sealed up with the paper seal. The paper seal of the invention can be used for surely airtightly sealing up the opening of an article such as a container that contains a moisture-absorbing material, for example, powdered beverage (instant coffee, instant tea, powdered cocoa, powdered juice, powdered drink, etc.), dry soup, instant miso soup, instant adzuki-bean soup, soup stock for boiled rice with tea, baked cookies (biscuits, rice crackers, etc.), snacks (corn-based confectionery, potato chips, etc.), solid sweets (candies, drops, etc.), higashi, a type of dry Japanese candies (rice-flour cakes, solid soda pop, etc.), dry noodles (spaghettis, vermicelli, etc.), instant noodles (instant Chinese noodles, instant wheat-flour noodles, snack noodles, etc.), milled flour (wheat flour, rice flour, mashed potato, etc.), processed cereals (bread crumbs, breadlike food made of wheat gluten, etc.), sugar (refined sugar, raw sugar, very-refined sugar, soft brown sugar, etc.), milk powder (powdered milk, whole powdered milk, skimmed milk powder, whey powder, etc.), dried meat (jerky, etc.), dried seafood (shark's fins, dried shrimps, dried shellfishes, dried bonito, dried small sardines, dried young sardines, dried cuttlefish, etc.), dried vegetables (dried gourd shavings, dried Japanese radish strips, dried shiitake mushrooms, dried sweet potatoes, etc.), dry fruits (raisin, figs, prunes, Lycium fruits, etc.), seaweeds (agar, laver, kelp, dried wakame, a kind of seaweed, etc.), tea (green tea, powdered green tea, black tea, oolong tea, etc.), other dried substances (dried bean curds, freeze-dried tofu, dried breadlike food made of wheat gluten, etc.), seasonings, spices and other dried foods, drugs, as well as everyday commodities such as powder detergents, dehumidifying agents, desiccants, powdered bath salts or the like, to thereby prevent the contents of the moisture-absorbing material from absorbing moisture.

In addition, the paper seal of the invention can be used for surely airtightly sealing up the opening of a container that contains a smelling food such as curry, pickles, fermented soybean (natto) or the like, to thereby prevent the smell of the contents of the food from leaking outside. Further, the paper seal of the invention can be used for securing the airtight sealing of a container that contains contents, for example, seasonings, spices, sauce and other foods and drinks and nonessential groceries, to thereby prevent the contents from being rotted or deteriorated. Moreover, the paper seal of the invention can be used for surely airtightly sealing up the opening of a container that contains, for example, medical instruments, callus cultures or the like to thereby prevent the contents from being contaminated with unwanted bacteria.

BACKGROUND ART

Heretofore employed is a technique of covering the opening of an article with a paper seal and, if desired, peeling the paper seal to open the opening. For example, a paper seal is stuck to the opening of a container filled with a powdery substance such as instant coffee, detergent or the like, and the paper seal is peeled to take out the powdery substance through the opening. Ordinary sealing is attained by applying a paste to the back of a paper seal, and putting the paper seal to the edge of the opening of a container body. An ordinary instant coffee container has a cap to be screwed and fitted to the container body, and an ordinary powdery detergent container has a cap linked to the container body via a hinge; and they are so planned that the cap covers the entire opening sealed up with a paper seal.

As the paper seal, for example, there are known those having a layer constitution of plastic film/paper or plastic film/aluminium foil/paper or the like (this is referred to as "conventional layer constitution 1") and those having a layer constitution of paper/plastic film/paper (this is referred to as "conventional layer constitution 2"). Examples of the conventional layer constitution 1 include a paper seal having a layer constitution of oriented polypropylene (OPP) having a thickness of 25 µm/wax having a unit weight of 15 g/m$^2$ and glassine paper having a unit weight of 26 g/m$^2$; and a paper seal having a layer constitution of moisture-proof cellophane/LDPE having a thickness of 20 µm/glassine paper having a unit weight of 25 g/m$^2$. Examples of the conventional layer constitution 2 include a paper seal having a layer constitution of glassine paper having a unit weight of 25 g/m$^2$/LDPE having at thickness of 20 µm/glassine paper having a unit weight of 25 g/m$^2$. These are to be stuck to openings on the side of the glassine paper thereof (Patent Reference 1).

Patent Reference 1: JP-UM-B 2-32567

DISCLOSURE OF THE INVENTION

Problems that the Invention is to Solve

The sealing with a paper seal mentioned in the above is such that an adhesive is applied to the adhering surface of the paper seal, and the paper seal is stuck to an article such as a container so as to seal up the opening thereof, using a labeling machine for paper seal. However, in the case where the paper seal having the conventional layer constitution 1 is used in sealing according to the process, the paper seal may curl during machine labeling since the symmetry of the layer constitution of the paper seal in the thickness direction is poor. In the case where the paper seal having the conventional layer constitution 2 is used, the paper seal may also curl owing to the expansion of the paper therein, since the paper part absorbs moisture. In any case, when containers are produced while sealed up with a paper seal, then the production yield may often worsen owing to the labeling trouble of curling, To solve the problem, use of a film in place of the natural paper may be taken into consideration. However, use of a film produces other problems in that current water-based adhesives, when used for the film, may take a lot of time in production as their driability is poor, that the stuck paper seal may be deviated from the intended sticking position and that the paper seal may fail in complete airtight sealing.

In its peeling (opening), a current paper seal is peeled by picking up the edge thereof; but the paper seal could not be completely peeled away, there occurs another problem in that the appearance of the peeled opening is not good.

Means for Solving the Problems

To solve the prior art problems as above, the present inventors have made the invention, of which the object is to provide a paper seal that can be stuck in a flat state without being curled by the environmental influence (humidity, temperature, etc.) during labeling or by the influence of seasonal variation, and can be peeled off completely.

The inventors have assiduously studied and have developed a stretched thermoplastic resin film having excellent bendability and good water absorbability, and have completed a paper seal improved in point of both the water-based adhesive applicability and the peelability. Specifically, as a means for solving the problems, the inventors have provided the present invention, which is as follows:

[1] A paper seal comprising a stretched thermoplastic resin film that comprises (a) a surface layer, (b) a substrate layer, and (c) a water-based adhesive-receiving layer having a water absorption level of from 2 to 25 ml/m$^2$, wherein the stretched thermoplastic resin film has a porosity of from 20 to 50% and a 120°-opening time by bending repulsion of from 20 to 70 seconds.

[2] The paper seal of [1], wherein the stretched thermoplastic resin film has a water vapor permeability of from 0 to 10 g/m$^2$/24 hrs.

[3] The paper seal of [1] or [2], wherein the substrate layer (b) has a porosity of from 20 to 50%.

[4] The paper seal of any one of [1] to [3], wherein the water-based adhesive-receiving layer (c) has a surface strength of from 0.8 to 2.0 kg-cm and an initial adhesion power of from 200 to 600 g.

[5] The paper seal of any one of [1] to [4], wherein the surface layer (a) comprises from 20 to 100% by weight of a thermoplastic resin (A), the substrate layer (b) comprises from 20 to 80% by weight of a thermoplastic resin (A) and from 80 to 20% by weight of at least one of an inorganic fine powder (B) and an organic filler (B'), and the water-based adhesive-receiving layer (c) comprises from 25 to 50% by weight of a thermoplastic resin (A) and from 75 to 50% by weight of an inorganic fine powder (B).

[6] The paper seal of [5], wherein the inorganic fine powder (B) in the water-based adhesive-receiving layer (c) is hydrophilicated with a surface-treating agent (C).

[7] A method for sealing an article, comprising sticking the paper seal of any one of [1] to [6] to an opening of an article with a water-based adhesive.

[8] A sealed article, of which an opening is sealed up with the paper seal of any one of [1] to [6] by a water-based adhesive.

[9] The sealed article of [8], wherein the opening is formed of paper.

[10] The sealed article of [8], wherein the opening is formed of carton paper.

[11] The sealed article of any one of [8] to [10], wherein the article is a container containing a moisture-absorbing material.

[12] The sealed article of [11], wherein the moisture-absorbing material is a powder detergent.

Effect of the Invention

The paper seal of the invention is significantly prevented from being curled and deformed by environmental changes such as temperature change and humidity change. According to the sealing method of the invention, the paper seal can be readily stuck to the opening of an article. Further, when the paper seal is peeled from the sealed article of the invention, it does not remain around the opening of the article.

BEST MODE FOR CARRYING OUT THE INVENTION

The paper seal of the invention is described in detail hereinunder. The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

Properties of Paper Seal

The paper seal of the invention is significantly prevented from being curled and deformed by environmental changes such as temperature change and humidity change. This is because the paper seal of the invention comprises a thermoplastic resin film alone and can keep symmetry, different from a paper seal having a conventional layer constitution. In addition, the paper seal of the invention is a laminate comprising a resin film as a whole, and therefore can readily control the permeability of various gases such as typically water vapor (moisture) through it and can prevent the penetration thereof through it.

In the paper seal of the invention, the inside, especially the substrate layer (b) to be the core contains pores, and therefore the paper seal has a suitable bending repulsion level. The bending repulsion is useful for inhibiting curling and deformation by environmental changes and also for preventing deformation by external force. For example, when a part of the contents are desired to be taken out from an article such as a container, the paper seal is bent to form an opening. In this case, when the bending repulsion is too small, then the opening formed by bending could not be restored to the original condition and the sealing effect of the intrinsic object of the invention could not be attained. On the contrary, when the bending repulsion is too large, then it may be difficult to take out the contents through the opening.

The paper seal of the invention comprises a thermoplastic resin film that has naturally no moisture absorbability, but this can be readily stuck to the opening of an article with a water-based adhesive. This is because the paper seal of the invention comprises the water-based adhesive-receiving layer (c) having a water absorption level of from 2 to 25 ml/m$^2$. To the water-based adhesive-receiving layer (c), a water-based adhesive is applicable. In addition, the water-based adhesive-receiving layer (c) does not swell with moisture and does not cause curling.

When the paper seal of the invention is stuck to the opening of an article and is peeled away from it, the paper seal hardly remains around the opening. This is because the water-based adhesive-receiving layer (c) has a suitable internal aggregation power and therefore hardly causes material fracture.

[120°-Opening Time by Bending Repulsion]

The paper seal of the invention comprises a stretched thermoplastic resin film comprising (a) a surface layer, (b) a substrate layer, and (c) a water-based adhesive-receiving layer having a water absorption level of from 2 to 25 ml/m$^2$, and is characterized by having a 120°-opening time by bending repulsion of from 20 to 70 seconds.

"120°-opening time by bending repulsion" in this application is determined as follows: A test piece of 10 cm×10 cm is cut out of the stretched thermoplastic resin film, folded in two, then statically kept under a load of 1 kg applied thereto for 30 seconds, thereafter the load is removed, and the time taken before the test piece has opened to have an opening angle of 120° is measured. The angle as referred to herein means the angle formed by the inflection point of the two-folded sample and the two edges thereof remotest from the inflection point (the two edges are in such a relation that they are remoter from each other with opening of the folded sample).

The 120°-opening time by bending repulsion of the paper seal of the invention is preferably from 20 to 60 seconds, more preferably from 20 to 50 seconds, even more preferably from 20 to 45 seconds. When the opening time by bending repulsion is shorter than 20 seconds, then it is problematic in that, in the case where the paper seal is stuck to the opening of a carton container or the like, the paper seal may lift up from the side face of the opening. In addition, since the restoration is rapid, there may be a possibility of having a failure in taking out the contents. When the opening time by bending repulsion is longer than 70 seconds, the paper seal restores slowly and therefore it requires another measure of pressing it with hand or the like, and there may be a possibility that the sealing effect could not be sufficiently exhibited.

The 120°-opening time by bending repulsion of the paper seal can be controlled to be from 20 to 70 seconds, for example, by controlling the porosity of the stretched thermoplastic resin film. In particular, it is desirable to control it by controlling the porosity of the substrate layer (b).

[Water Vapor Permeability]

The water vapor permeability of the stretched thermoplastic resin film constituting the paper seal of the invention (as measured according to a cup method (JIS-Z-0208)) is preferably from 0 to 10 $g/m^2/24$ hrs, more preferably from 1 to 9.5 $g/m^2/24$ hrs, even more preferably from 2 to 8 $g/m^2/24$ hrs. When the water vapor permeability is at most 10 $g/m^2/24$ hrs, then the contents of the sealed article (for example, powder detergent) may hardly absorb moisture to aggregate, and can readily keep their function. The water vapor permeability may be controlled, for example, by controlling the resin material, the porosity and the thickness of the stretched thermoplastic resin film.

[Initial Adhesion Power]

In the case where the paper seal of the invention is stuck to the opening of an article such as a carton container, using a water-based adhesive, the initial adhesion power thereof is preferably from 200 to 600 g, more preferably from 220 to 600 g, even more preferably from 220 to 580 g. The initial adhesion power may be controlled, for example, by selecting the type of the water-based adhesive to be used, controlling the coating amount thereof, and controlling the water absorption level and the surface strength of the water-based adhesive-receiving layer (c). Preferably, the adhesion power is controlled especially in accordance with the use and the application as well as the surface strength property of the paper seal.

[Porosity]

The porosity of the stretched thermoplastic resin film to constitute the paper seal of the invention is from 20 to 50%. It is preferably from 25 to 50%, more preferably from 30 to 50%. When the porosity of the stretched thermoplastic resin film in the invention is at least 20%, then any strong repulsion does not act in the direction opposite to the substrate bending direction when the paper seal is stuck to the opening of an article such as a carton container, and therefore the paper seal does not curl and can airtightly adhere to the side face of the opening. As a result, a labeling trouble to be caused by curling can be prevented. When the porosity is at most 50%, then the film is hardly cracked while stretched in film production, therefore readily enabling more stable production thereof.

Especially preferably, the porosity of the substrate layer (b) to constitute the stretched thermoplastic resin film is from 20 to 50%, even more preferably from 30 to 48%. When the porosity of the substrate layer (b) is higher, then the paper seal could be more readily folded to lose its repulsion, and it hardly curls and can attain complete sealing. However, when the repulsion of the paper seal is too low and when the paper seal is too readily folded, it could not restore during use (when the contents are taken out), and the contents after opening the seal may absorb moisture. In addition, for stably producing the film and for reducing the water vapor permeability of the film, the porosity is preferably at most 50%. The porosity may be controlled by controlling the content of the inorganic fine powder or the organic filler and controlling the draw ratio in stretching the film.

The presence of pores inside the film can be confirmed by observing the cross section of the film with an electronic microscope. The porosity can be determined by taking an electromicroscopic picture of the cross section, and determining the areal ratio (%) of the pores in the region of the cross section taken in the picture. Concretely, the stretched thermoplastic resin film is embedded in an epoxy resin and solidified therein, then using a microtome, this is sliced into slices each having a cut face in the direction parallel to the thickness direction of the film (that is, in the direction perpendicular to the plane direction of the film), and thereafter the cut face is metallized and observed at a desired enlarged magnification power (for example, 500-power to 2000-power) with a scanning electron microscope. Further, the pore part is traced on a tracing film and stained, and the thus-processed image is analyzed with an image analyzer (Nireco's Luzex IID Model) to determine the areal ratio (%) of the pores seen in the analyzed region. This is the porosity (%) of the film.

Having a multi-layered structure, the stretched thermoplastic resin film may be analyzed according to the above-mentioned method to determine the porosity (%) of each layer of the film. Accordingly, the porosity of the substrate layer (b) can also be determined in the same manner as above.

[Water Absorption]

The water absorption level of the water-based adhesive-receiving layer (c) constituting the paper seal of the invention is from 2 to 25 $ml/m^2$. The water absorption level is preferably from 10 to 25 $ml/m^2$. When the water absorption level is from 2 to 25 $ml/m^2$, then the paper seal can be stuck to an article such as a container at high speed, and in addition, it can keep the initial adhesion power thereof in sticking. When the level is less than 2 $ml/m^2$, then the drying speed of the water-based adhesive may be low and the paper seal could not have the desired initial adhesion power in sticking, and it may be deviated from the sticking position. On the other hand, when the level is more than 25 $ml/m^2$, then the water-based adhesive may dry too rapidly after its application; and if so, the adhesive may be completely in dry when the paper seal is stuck to an article, and the paper seal could not have the desired initial adhesion power. The water absorption level of the water-based adhesive-receiving layer (c) can be controlled, for example, by controlling the amount of the inorganic fine powder (B) to be added to the water-based adhesive-receiving layer (c), the presence or absence of hydrophilication treatment of the inorganic fine powder (B), and the thickness of the water-based adhesive-receiving layer (c).

[Surface Strength]

In order that the paper seal can be completely peeled away from an article such as a container in such that the adhesive does not remain on the container owing to material fracture of the sticking face of the paper seal, preferably, the surface strength of the water-based adhesive-receiving layer (c) of the paper seal falls within a predetermined range. Concretely, an adhesive tape (Nichiban's trade name, Cellotape®, Code "CT-18") is airtightly stuck to the surface on the side of the water-based adhesive-receiving layer (c) of the paper seal, and according to the method described in JAPAN TAPPI No. 18-2, the adhesive tape is peeled away using Internal Bond Tester (by Kumagai Riki Kogyo), whereupon the peeling strength is measured. Thus measured, the peeling strength is preferably from 0.8 to 2.0 kg-cm, more preferably from 1.0 to 1.8 kg-cm. When the strength is at least 0.8 kg-cm, then the paper seal hardly undergoes material fracture when it is peeled away from a container, and the material of the paper seal hardly remains on the container. When the strength is at most 2.0 kg-cm, then the water-based adhesive-receiving layer (c) can express a sufficient water-absorbing capability, and therefore the paper seal can readily has the desired initial adhesion power in sticking. The surface strength of the water-based adhesive-receiving layer (c) can be controlled, for example, by controlling the amount of the inorganic fine powder (B) in the water-based adhesive-receiving layer (c) and controlling the draw ratio in stretching the film.

In general, the water absorption level and the surface strength tend to be in contradictory to each other, but can be suitably controlled in accordance with the requirements in use.

Constitutive Materials of Paper Seal

[Thermoplastic Resin]

The stretched thermoplastic resin film for use in the paper seal of the invention contains a thermoplastic resin. The usable thermoplastic resin includes crystalline polyolefinic resin such as crystalline ethylenic resin, e.g., high-density polyethylene, midium-density polyethylene, low-density polyethylene, and crystalline propylenic resin, polymethyl-1-pentene; polyamide resin such as nylon-6, nylon-6,6, nylon-6,10, nylon-6,12; thermoplastic polyester resin such as polyethylene terephthalate and its copolymer, polyethylene naphthalate, aliphatic polyester; and other thermoplastic resins such as polycarbonate, polyvinyl alcohol, ethylene-vinyl alcohol copolymer, polyvinyl chloride, polyvinylidene chloride, atactic polystyrene, syndiotactic polystyrene, polyphenylene sulfide, etc. Two or more of these may be used, as combined.

Of those, preferred is crystalline polyolefinic resin from the viewpoint of the water vapor permeability, the water resistance, the chemical resistance, the production cost, etc. More preferred is crystalline propylenic resin. Crystalline polyolefinic resin exhibits crystallinity. The degree of crystallinity of the resin, as measured through X-ray diffractiometry, is preferably at least 20%, more preferably from 35 to 75%. Those with no crystallinity could not sufficiently form pores (openings) in the surface of the thermoplastic resin film when the film is stretched. The degree of crystallinity can be determined according to X-ray diffractiometry, IR spectrometry, etc.

As the crystalline propylenic resin, preferred is a, isotactic polymer or syndiotactic polymer produced through homopolymerization of propylene. Also usable are various propylene-based copolymers with stereospecificity, produced through copolymerization of propylene with an α-olefin such as ethylene, 1-butene, 1-hexene, 1-heptene, 4-methyl-1-pentene, etc. The copolymer may be a binary, ternary or more multinary one, and may be a random copolymer or a block copolymer.

[Inorganic Fine Powder (B) and Organic Filler (B')]

Examples of the inorganic fine powder (B) usable in the stretched thermoplastic resin film to constitute the paper seal of the invention include inorganic fine powder such as heavy calcium carbonate, light calcium carbonate, calcined clay, talc, titanium oxide, barium sulfate, zinc oxide, magnesium oxide, diatomaceous earth, silicon oxide; composite inorganic fine powder having aluminium oxide or hydroxide around the nucleus of the particle of inorganic fine powder; hollow glass beads; inorganic fine powder (B) hydrophilicated with surfactant (C) to be mentioned below, etc. Above all, preferred are heavy calcium carbonate, calcined clay and diatomaceous earth, as inexpensive and capable of forming many pores in stretching the film, and capable of readily controlling the porosity of the film.

Preferably, the organic filler (B') is selected from a resin having a higher melting point or glass transition point than that of the above-mentioned thermoplastic resin and immiscible with the resin for forming pores. Concrete examples are polyethylene terephthalate, polybutylene terephthalate, polyamide, polycarbonate, polyethylene naphthalate, polystyrene, acrylate or methacrylate polymer and copolymer, melamine resin, polyethylene sulfide, polyimide, polyethyl ether ketone, polyphenylene sulfide, homopolymer of cyclic olefin, copolymer of cyclic olefin with ethylene (COC), etc. In the case where a crystalline polyolefinic resin is used as the above-mentioned thermoplastic resin, in particular, the organic filler (B') is preferably selected from polyethylene terephthalate, polybutylene terephthalate, polyamide, polycarbonate, polyethylene naphthalate, polystyrene, homopolymer of cyclic olefin, and copolymer of cyclic olefin with ethylene (COC).

[Inorganic Fine Powder (B) Hydrophilicated with Surface-Treating Agent (C)]

The inorganic fine powder (B) for use in the invention may be hydrophilicated with a surface-treating agent (C), for which an inorganic compound being ground in wet is treated with a water-soluble anionic, cationic or nonionic polymer surfactant having a mean molecular weight of from 1,000 to 150,000. An inorganic compound being ground in wet may be treated with an anionic, cationic or nonionic antistatic agent. Both the treatments may be attained in two stages. Preferred examples of the hydrophilicated inorganic fine powder are described in JP-A 7-300568.

Layer Constitution

The stretched thermoplastic resin film for use in the paper seal of the invention has a multi-layered structure comprising at least (a) a surface layer, (b) a substrate layer, and (c) a water-based adhesive-receiving layer. This may additionally comprise any other thermoplastic resin film layer between the surface layer (a) and the substrate layer (b), or between the substrate layer (b) and the water-based adhesive-receiving layer (c).

The other thermoplastic resin film layer is provided for the purpose of further improving the function of the paper seal of the invention or for adding an additional function to the paper seal. The other thermoplastic resin film layer includes, for example, a resin layer of polyamide, polyvinyl alcohol, ethylene-vinyl alcohol copolymer, polyvinylidene chloride or the like, or a resin film deposited with silver, aluminium, silicon oxide, alumina oxide or the like for enhancing the gas-barrier property of the paper seal, or a resin layer of polyethylene terephthalate, polycarbonate or the like for enhancing the odorous substance-barrier property thereof.

The paper seal of the invention may be printed with patterns or letters on both surfaces thereof. The surface of the paper seal may be printed with patterns or letters indicating various informations such as product name, etc. The back of the paper seal may be printed with patterns or letters indicating various informations capable of being confirmed after opening the seal.

[Surface Layer (a)]

The surface layer (a) to be in the stretched thermoplastic resin film in the invention is provided for ensuring the symmetry in the thickness direction of the stretched thermoplastic resin film and for preventing the film from curling, and in addition, this serves as a layer printable with patterns or letters of various informations in an ordinary printing mode of offset printing, gravure printing, flexographic printing or the like.

The surface layer (a) to be in the stretched thermoplastic resin film in the invention preferably comprises from 20 to 100% by weight of a thermoplastic resin (A) and from 80 to 0% by weight of at least one of an inorganic fine powder (B) and an organic filler (B'), more preferably from 30 to 70% by weight of a thermoplastic resin (A) and from 70 to 30% by weight of at least one of an inorganic fine powder (B) and an organic filler (B'), even more preferably from 40 to 60% by weight of a thermoplastic resin (A) and from 60 to 40% by weight of at least one of an inorganic fine powder (B) and an organic filler (B').

The thickness of the surface layer (a) is preferably from 3 to 25 μm, more preferably from 4 to 20 μm, even more preferably from 5 to 15 μm.

[Substrate Layer (b)]

The substrate layer (b) to be in the stretched thermoplastic resin film in the invention has pores inside it therefore giving a suitable degree or bending repulsion to the paper seal. In addition, this serves as a core in stretching and forming the film.

The substrate layer (b) to be in the stretched thermoplastic resin film in the invention preferably comprises from 50 to 90% by weight of a thermoplastic resin (A) and from 50 to 10% by weight of at least one of an inorganic fine powder (B) and an organic filler (B'), more preferably from 55 to 85% by weight of a thermoplastic resin (A) and from 45 to 15% by weight of at least one of an inorganic fine powder (B) and an organic filler (B'), even more preferably from 60 to 80% by weight of a thermoplastic resin (A) and from 40 to 20% by weight of at least one of an inorganic fine powder (B) and an organic filler (B').

The thickness of the substrate layer (b) is preferably from 10 to 200 μm, more preferably from 20 to 140 μm, even more preferably from 30 to 80 μm.

[Water-Based Adhesive-Receiving Layer (c)]

The water-based adhesive-receiving layer (c) to be in the stretched thermoplastic resin film in the invention can absorb a certain amount of moisture through its surface, and therefore a water-based adhesive can be applied to it, and the layer can exhibit the function of sealing up an article such as a container with the paper adhesive of the invention.

The water-based adhesive-receiving layer (c) to be in the stretched thermoplastic resin film in the invention may comprise from 25 to 75% by weight of a thermoplastic resin (A) and from 75 to 25% by weight of an inorganic fine powder (B), preferably from 30 to 50% by weight of a thermoplastic resin (A) and from 70 to 50% by weight of an inorganic fine powder (B).

In the water-based adhesive-receiving layer (c), preferably used is the above-mentioned inorganic fine powder (B) hydrophilicated with a surface-treating agent (C) for the purpose of enhancing the water absorbability of the layer. Since the hydrophilicity of the water-based adhesive-receiving layer (c) is enhanced, the adhesiveness of a water-based adhesive to the water-based adhesive-receiving layer (c) and the driability thereof can be enhanced.

The thickness of the water-based adhesive-receiving layer (c) is preferably from 3 to 25 μm, more preferably from 4 to 20 μm, even more preferably from 5 to 20 μm.

[Additives]

If desired, additives such as thermal stabilizer, UV stabilizer, antioxidant, antiblocking agent, nucleating agent, lubricant, colorant and the like can be added to the surface layer (a), the substrate layer (b) and the water-based adhesive-receiving layer (c). Preferably, the additive is added to the layer in an amount of from 0.01 to 3% by weight each.

Method for Producing Paper Seal

The paper seal of the invention can be produced by combining various methods known to those skilled in the art. Paper seals produced by any method fall within the scope of the invention so far as they satisfy the conditions stated in claims.

[Formation of Layers]

The substrate layer (b) and the surface layer (a) constituting the stretched thermoplastic resin film may be formed by mixing a thermoplastic resin, at least one of an inorganic fine powder (B) and an organic filler (B') in a predetermined ratio, then forming it into a film according to a method of extrusion or the like, and monoaxially or biaxially stretching the film at a temperature lower than the melting point of the thermoplastic resin (preferably lower by from 5 to 60° C.). The stretching may be attained during forming the film.

The water-based adhesive-receiving layer (c) constituting the stretched thermoplastic resin film may be formed by mixing a thermoplastic resin and an inorganic fine powder (B), preferably an inorganic fine powder (B) hydrophilicated with a surface-treating agent (C) in a predetermined ratio, then forming it into a film according to a method of extrusion or the like, and monoaxially or biaxially stretching the film at a temperature lower than the melting point of the thermoplastic resin (preferably lower by from 5 to 60° C.). Also in this, the stretching may be attained during forming the film.

[Lamination]

The laminate film structure of the stretched thermoplastic resin film may also be produced by separately preparing the layers and laminating them, or may be produced by laminating them followed by stretching in all.

For example, a surface layer (a) is laminated on one surface of a substrate layer (b), and a water-based adhesive-receiving layer (c) is laminated on the other surface thereof, and the resulting laminate may be monoaxially or biaxially stretched to give a laminate structure in which all the constitutive layers are monoaxially or biaxially oriented. Differently, the substrate layer (b) may be stretched monoaxially and then a surface layer (a) and a water-based adhesive-receiving layer (c) maybe laminated on both surfaces of the layer (b), and thereafter the resulting laminate may be again monoaxially stretched to give a laminate structure of monoaxial/biaxial/monoaxial orientation.

In order to add the above-mentioned other thermoplastic resin film layer to the film in the invention, the constitutive layers may be separately stretched and then laminated, or as described in the above, the constitutive layers may be first laminated and then stretched in all. The latter may be favorable as simple and capable of reducing the production cost. Preferably, the paper seal of the invention is produced according to any of these methods.

[Stretching]

Various known methods are employable for stretching. Preferably, the stretching is attained at a temperature lower by at least 5° C. than the melting point of the resin. In the case where two or more different types of resins are used as combined, preferably, the stretching is attained at a temperature lower by at least 5° C. than the melting point of the resin of which the amount is the largest.

As a concrete method for stretching, there are mentioned roll-to-roll stretching to be attained by utilizing the peripheral speed difference between the rolls, clip stretching to be attained by the use of a tenter oven, or their combination. The roll-to-roll stretching is preferred, in which the draw ratio in stretching may be controlled in any desired manner to give various stretched thermoplastic resin films having desired rigidity, opacity, surface smoothness, gloss. In clip stretching, a linear motor or a pantograph may be used for simultaneous biaxial stretching.

Not specifically defined, the draw ratio in stretching may be determined in consideration of the use and the object of the paper seal of the invention and the property of the thermoplastic resin to be used. In roll-to-roll stretching, in general, the ratio is preferably from 2 to 11 times, more preferably from 3 to 10 times, even more preferably from 4 to 7 times. In clip stretching with a tenter oven, the draw ratio is preferably from 4 to 11 times. The areal draw radio in sequential biaxial stretching by the combination of the above two may be generally from 2 to 80 times, preferably from 3 to 60 times, more preferably from 4 to 50 times. The areal draw ratio in simultaneous biaxial stretching may be generally from 2 to 80 times, preferably from 3 to 60 times, more preferably from 4 to 50 times. Increasing the areal draw ratio by at least two times tends to facilitate the production of a stretched thermoplastic resin film having a more uniform thickness, preventing the stretching unevenness. Stretching by at most 80 times tends to prevent more effectively the film from being cut during stretching or from having large holes.

[Heat Treatment]

After stretched, the thermoplastic resin film is preferably heat-treated (annealed). Preferably, the heat treatment temperature is selected within a range of from the stretching temperature to a temperature higher by 30° C. than the stretching temperature. As a result of the heat treatment, the thermal shrinkage of the film in the stretching direction may be reduced, and the roll of the film may be prevented from being tightly rolled during storage of the film product, and the film may be prevented from being crimped through thermal shrinkage thereof. For the heat treatment, generally employed is roll heating or oven heating, or their combination. During the heat treatment, preferably, the stretched film is kept under tension for attaining a more effective result. After the heat treatment, preferably, the film is processed for surface oxidation through corona discharge treatment or plasma treatment in consideration of the post treatment thereof for imparting printability to the film. Not specifically defined, the overall thickness of the paper seal of the invention is preferably from 45 to 250 μm, more preferably from 50 to 175 μm, even more preferably from 55 to 95 μm.

[Printing]

The surface layer (a) and the water-based adhesive-receiving layer (c) may be printed with patterns, letters or both in various pattern-printing methods (e.g., offset printing, gravure printing, flexographic printing), letter-printing methods (e.g., inkjet mode, thermal transfer mode, electrophotographic mode) or both. In addition, a metal layer of aluminium, copper, silver or the like (e.g., metal foil, metal deposition film, metal particles (granular or leafing-type) ink print layer) may be provided.

[Cutting]

Next, the film may be cut into a size suitable to use as the paper seal of the invention. The cutting may be attained in any ordinary manner known to those skilled in the art. For example, it includes blanking with a Thompson blade or cutting with a cutter.

The shape and the size of the paper seal of the invention are not specifically defined. Depending on the shape and the size of the opening to which it is stuck, the paper seal may have any shape and size. Accordingly, when the shape of the opening to which it is stuck is circular, the paper seal may be circular; but when it is rectangular, the paper seal may be rectangular having a similar figure thereto. In general, the paper seal is prepared that has a shape capable of entirely covering the opening. For example, the paper seal is preferably so cut as to have a size larger by from 2 to 7 mm or so in diameter than the outer diameter of the opening so that, when it is stuck to the opening, the paper seal can have a margin of the enlarged diameter to be a pick-up portion in peeling the seal.

In that manner, the film may be previously cut to have a size corresponding to the opening to which it is stuck, and the thus-cut film may be stuck to the opening to seal up it; however, in the invention, a non-cut film in the form of a roll may be prepared, and after it has been stuck to the opening, it may be cut at a suitable position. In mass-scale industrial production of sealed articles, the latter method may be preferably employed.

Sealing Method

[Sealing Step]

The paper seal of the invention can be stuck to the opening of an article, using a water-based adhesive, and through this step, the opening can be sealed up with the paper seal. The surface to be stuck to the opening is on the side of the surface of the water-based adhesive-receiving layer (c) of the paper seal of the invention. Comprising this step, the sealing method of the invention may include any other step.

Concretely, a water-based adhesive dissolved or swollen with water is applied to at least one of the sticking region of the water-based adhesive-receiving layer (c) of the paper seal of the invention and the sticking region of the opening, and the two are bonded to each other and then dried. The method for applying the water-based adhesive may be suitably selected from ordinary coating methods. In the invention, preferably, a water-based adhesive is applied to the water-based adhesive-receiving layer (c) by coating. The drying may be spontaneous drying or may be accelerated according to a method of introducing into a high-temperature chamber or exposing to hot air. Use of the paper seal of the invention may shorten the drying time, therefore saving the energy and the time for drying, and realizing efficient sealing.

[Water-Based Adhesive]

The water-based adhesive for use in the invention is an adhesive capable of dissolving or swelling in water. For example, one preferred example is a so-called "glue paste" comprising an aqueous solvent, and a natural polymer or a solid plasticizer and a polymer. The water-based adhesive usable in the invention preferably comprises at least one of starch, glue, casein, cellulose, sodium alginate, guar gum, latex, polymaleic acid-based polymer, polyvinyl alcohol, polyvinyl pyrrolidone, carboxymethyl cellulose, methyl cellulose, gelatin, pullulan, acrylic resin, urethane resin and vinyl acetate resin. Of those, more preferred is one comprising starch and casein. As the water-based adhesive, usable is an aqueous solution or an emulsion comprising the above-mentioned substance.

The dry coating amount of the water-based adhesive for use in sticking the paper seal of the invention to an opening may be suitably selected depending on the water absorption level of the stretched thermoplastic resin film constituting the paper seal and on the solid concentration of the water-based adhesive. In general, the amount is preferably from 2 to 100 g/m$^2$, more preferably from 5 to 50 g/m$^2$, even more preferably from 10 to 30 g/m$^2$. When the dry coating amount of the water-based adhesive is at least 2 g/m$^2$, then a substantial adhesion strength may be given with ease to the area between the paper seal and the opening; and when the amount is at most 100 g/m$^2$, then the water-based adhesive may be rapidly dried to attain sufficient sticking with ease.

Subject for Paper Seal Application

The paper seal of the invention may be applied to various articles having an opening by suitably selecting the type and the property of the water-based adhesive to be therein.

[Article (Container, etc.)]

For example, the paper seal of the invention is favorably applied to articles such as containers, etc. Concretely, the invention is applicable to articles into which a broad variety of materials are to be put, for example, foods such as solid foods, liquid foods, drinks; medicines; powdery industrial products such as bath salts, powder detergents; liquid industrial products such as liquid detergents. Since the paper seal of the invention can be so designed as to have a reduced water vapor permeability, it is preferably applied to articles in which a moisture-absorbing material is put; and in particular, it is more preferably applied to containers in which a powdery industrial product having high moisture absorbability such as powder detergent is put. The moisture-absorbing material as referred to herein is meant to indicate a material of which the weight increases by at least 5% by weight when left under a condition of a temperature of 40° C. and a relative humidity of 90% for 3 days. The paper seal of the invention is more effectively applied to a moisture-absorbing material having a weight increase of at least 10% by weight, even more effectively to that having a weight increase of at least 25% by weight, still more effective to that having a weight increase of at least 50% by weight.

Further, for example, the paper seal of the invention can also be planned to have a reduced moisture permeability and a reduced vapor permeability, and therefore it is favorably applied to containers in which odorous foods such as curry, pickles, fermented soybean (natto) or the like are put, and also to containers in which medical instruments or articles that are prevented from being contaminated with unwanted bacteria, such as callus cultures or the like, are put.

Not specifically defined, the shape and the size of the container may be any ones capable of being sealed up with the paper seal of the invention. For example, there are mentioned cylindrical containers (including those tapered toward the top or the bottom), pillar containers (for example, triangular to octagonal pillars, rectangular parallelepipeds), spherical or oval containers (of which the opening to be sealed up is flat), basket containers, etc.

[Subject for Application Except Container]

The paper seal of the invention has other applications except for sealing up containers. For example, in one embodiment for protecting articles (for example, lenses, easily scratchable components, moisture-absorbing components) set inside an opening, the paper seal of the invention may be stuck to the opening, and in use of the articles, the paper seal is peeled away and the articles to be used are taken out. In another embodiment, for protecting the letters (e.g., lottery, password) printed in an opening from being invisible from the outside, the paper seal of the invention that is nontransparent is stuck to the opening, and when the letter information is needed, the paper seal is peeled away to confirm the letter information.

[Opening of Article]

The paper seal of the invention is applied to an article of which the opening is formed of a material suitable for application of the paper seal thereto via a water-based adhesive, preferably to that formed of a moisture-absorbing material (e.g., paper, wood, celluloid, polyvinyl alcohol), more preferably to that formed of paper. Paper as referred to herein include synthetic paper. Specifically, it includes not only pulp paper but also laminates of paper with a film of polyethylene or the like. The invention is especially favorably applied to articles of which the opening is formed of carton paper. The material of the opening as referred to herein is meant to indicate the material of the part with which the paper seal of the invention is kept in contact in sealing up the opening. Therefore, the paper seal of the invention is applicable even to articles of which the opening alone is formed of paper and the other parts are formed of any other material than paper.

Peeling of Paper Seal

The paper seal stuck to an opening of an article may be readily peeled away by picking up its one side or edge with fingers and pulling it up in use of the contents in the article. For the purpose of facilitating the peeling, the paper seal of the invention may be formed to have a pick-up portion. For example, it may have a semicircular or tongue-like pick-up portion. Not specifically defined, the size of the pick-up portion may be any one capable of being picked up with fingers. In general, it may be formed by extending a part of the paper seal body by from 1 to 3 cm or so toward the outside.

The paper seal of the invention may be notched. For example, in the case where a drink container is sealed up with the paper seal, only the lip thereof may be desired to be opened without completely peeling away the paper seal entirely from the opening. In such a case, the paper seal is previously notched in the outer periphery thereof corresponding to the region where the paper seal is peeled away, and using the notch, only the desired region of the paper seal can be peeled away. The notches may be disposed in different sites.

EXAMPLES

The invention is described more concretely with reference to Production Examples, Examples and Test Examples given below. In the Production Examples and Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

Production Examples 1 to 12, 14, 15

Production of Stretched Thermoplastic Resin Film

The details of the material used are shown in Table 1. In the Table, "MFR" means a melt flow rate. In Table 2, shown are the type and the amount (% by weight) of the material used in producing individual stretched thermoplastic resin films, the stretching condition, the number of the constitutive layers and the thickness of each layer. The number of the material shown in Table 2 corresponds to the number of the material in Table 1.

Production Example 1

In Production Example 1, the mixture [a], the mixture [b] and the mixture [c] shown in Table 2 were separately melt-kneaded in three separate extruders each set at 250° C., then co-extruded and shaped to give a three-layer structure of a/b/c, and cooled in a cooling apparatus to 70° C. to give an unstretched film. The unstretched film was heated at the stretching temperature (1) shown in Table 2, and then stretched in the machine direction between rolls by 5 times to give a monoaxially-stretched film. This was annealed at a temperature higher by 20° C. than the stretching temperature (1) of the film, and then processed for corona treatment on both surfaces thereof using a discharger (by Kasuga Electric) at 40 W/m²/min, thereby giving a monoaxially-stretched three-layered film.

Production Example 2

In Production Example 2, the mixture [a], the mixture [b] and the mixture [c] each having the composition shown in Table 2 were separately melt-kneaded in three separate extruders each set at 250° C., then co-extruded and shaped to give a three-layer structure of a/b/c, and cooled in a cooling apparatus to 70° C. to give an unstretched film. The unstretched film was heated at the stretching temperature (1) shown in Table 2 and stretched in the machine direction between rolls by 5 times, then heated at the stretching temperature (2) shown in Table 2 and stretched by 8 times in the transverse direction using a tenter stretcher, and then annealed at a temperature higher by 20° C. than the stretching temperature (1). The obtained film was processed for corona treatment on both surfaces thereof using a discharger (by Kasuga Electric) at 40 W/m²/min, thereby giving a biaxially-stretched three-layered film.

Production Example 9

In Production Example 9, the mixture [a], the mixture [b] and the mixture [c] each having the composition shown in Table 2 were separately melt-kneaded in three separate extruders each set at 250° C., then co-extruded and shaped to give a three-layer structure of a/b/c, and cooled in a cooling apparatus to 70° C. to give an unstretched film. The obtained film was processed for corona treatment on both surfaces thereof using a discharger (by Kasuga Electric) at 40 W/m²/min, thereby giving an unstretched three-layered film.

Production Examples 3 to 8, 10 to 12, 14, 15

In Production Examples 3 to 8, 10 to 12, 14, 15, the mixture [b] having the composition shown in Table 2 was melt-kneaded in an extruder set at 250° C., then extruded and shaped, and thereafter cooled in a cooling apparatus to 70° C. to give an unstretched film. The unstretched film was heated at the stretching temperature (1) shown in Table 2 and stretched in the machine direction between rolls by 5 times. Next, the mixture [a] and the mixture [c] were separately melt-kneaded in extruders set at 250° C., and laminated on both surfaces of the above-mentioned MD-monostretched film. Then, this was heated at the stretching temperature (2) shown in Table 2, and stretched by 8 times in the transverse direction using a tenter stretcher, and then annealed at a temperature higher by 20° C. than the stretching temperature (2). The obtained film was processed for corona treatment on both surfaces thereof using a discharger (by Kasuga Electric) at 40 W/m²/min, thereby giving a monostretched/bistretched/monostretched three-layered film.

Production Example 13

As Production Example 13, used was a stretched film that is the same as that in Example 8 in JP-A 10-212367.

TABLE 1

| Material | Designation of Material | Details |
|---|---|---|
| 1 | Propylene Homopolymer | Propylene homopolymer (trade name, Novatec PP FY4, MFR: 5 g/10 min (230° C., 2.16 kg load), m.p.: 164° C. (DSC peak temperature), manufactured by Nippon Polypro) |
| 2 | High-Density Polyethylene | High-density polyethylene (trade name, Novatec HD HJ360, MFR: 5.5 g/10 min (190° C., 2.16 kg load), m.p.: 132° C. (DSC peak temperature), manufactured by Nippon Polyethylene) |
| 3 | Heavy Calcium Carbonate | Dry-ground heavy calcium carbonate (trade name, Softon 1800, mean grain size: 1.25 μm (measured according to air permeation method), manufactured by Bihoku Hunka Kogyo) |
| 4 | Surface-Processed Calcium Carbonate | Surface-processed calcium carbonate, prepared by surface-treating with water-soluble cationic surfactant during wet grinding, and further surface-treating with anionic antistatic agent (trade name, AFF-Z, by Fimatec) |

TABLE 2

| | Mixture [a] | | Mixture [b] | | Mixture [c] | | Stretching Temperature (1) (° C.) | Stretching Temperature (2) (° C.) | Layer Constitution | Stretching Mode | Draw Ratio | Areal Draw Ratio of Layer [B] | Thickness of Layer after stretched (μm) |
|---|---|---|---|---|---|---|---|---|---|---|---|---|---|
| | Material | Amount Added (wt. %) | Material | Amount Added (wt. %) | Material | Amount Added (wt. %) | | | | | | | |
| Production Example 1 | 1 | 45 | 1 | 60 | 1 | 40 | 130 | | 3 | [a] monoaxial | 5 | 5 | 10 |
| | 3 | 55 | 2 | 10 | 4 | 60 | | | | [b] monoaxial | | | 50 |
| | | | 3 | 30 | | | | | | [c] monoaxial | | | 10 |
| Production Example 2 | 1 | 45 | 1 | 60 | 1 | 40 | 130 | 145 | 3 | [a] biaxial | 5/8 | 40 | 10 |
| | 3 | 55 | 2 | 10 | 4 | 60 | | | | [b] biaxial | | | 50 |
| | | | 3 | 30 | | | | | | [c] biaxial | | | 10 |
| Production Example 3 | 1 | 45 | 1 | 60 | 1 | 45 | 130 | 145 | 3 | [a] monoaxial | 5/8 | 40 | 10 |
| | 3 | 55 | 2 | 10 | 4 | 55 | | | | [b] biaxial | | | 35 |
| | | | 3 | 30 | | | | | | [c] monoaxial | | | 10 |
| Production Example 4 | 1 | 45 | 1 | 60 | 1 | 40 | 130 | 145 | 3 | [a] monoaxial | 5/8 | 40 | 10 |
| | 3 | 55 | 2 | 10 | 4 | 60 | | | | [b] biaxial | | | 45 |
| | | | 3 | 30 | | | | | | [c] monoaxial | | | 15 |
| Production Example 5 | 1 | 45 | 1 | 60 | 1 | 40 | 130 | 145 | 3 | [a] monoaxial | 5/8 | 40 | 10 |
| | 3 | 55 | 2 | 10 | 4 | 60 | | | | [b] biaxial | | | 65 |
| | | | 3 | 30 | | | | | | [c] monoaxial | | | 10 |

TABLE 2-continued

| | Mixture [a] | | Mixture [b] | | Mixture [c] | | Stretching Temperature (1) (° C.) | Stretching Temperature (2) (° C.) | Layer Constitution | Stretching Mode | Draw Ratio | Areal Draw Ratio of Layer [B] | Thickness of Layer after stretched (μm) |
|---|---|---|---|---|---|---|---|---|---|---|---|---|---|
| | Material | Amount Added (wt. %) | Material | Amount Added (wt. %) | Material | Amount Added (wt. %) | | | | | | | |
| Production Example 6 | 1<br>3 | 45<br>55 | 1<br>2<br>3 | 45<br>10<br>45 | 1<br>4 | 40<br>60 | 130 | 145 | 3 | [a] monoaxial<br>[b] biaxial<br>[c] monoaxial | 5/8 | 40 | 10<br>68<br>10 |
| Production Example 7 | 1<br>3 | 45<br>55 | 1<br>2<br>3 | 74<br>10<br>16 | 1<br>4 | 40<br>60 | 130 | 145 | 3 | [a] monoaxial<br>[b] biaxial<br>[c] monoaxial | 5/8 | 40 | 10<br>63<br>10 |
| Production Example 8 | 1<br>3 | 45<br>55 | 1<br>2<br>3 | 60<br>10<br>30 | 1<br>4 | 30<br>70 | 130 | 145 | 3 | [a] monoaxial<br>[b] biaxial<br>[c] monoaxial | 5/8 | 40 | 10<br>65<br>10 |
| Production Example 9 | 1<br>3 | 45<br>55 | 1<br>2<br>3 | 60<br>10<br>30 | 1<br>4 | 40<br>60 | | | 3 | [a] zero-axial<br>[b] zero-axial<br>[c] zero-axial | 1 | 1 | 10<br>50<br>10 |
| Production Example 10 | 1<br>3 | 45<br>55 | 1<br>2<br>3 | 60<br>10<br>30 | 1<br>3 | 40<br>60 | 130 | 145 | 3 | [a] monoaxial<br>[b] biaxial<br>[c] monoaxial | 5/8 | 40 | 10<br>65<br>10 |
| Production Example 11 | 1<br>3 | 45<br>55 | 1<br>2<br>3 | 60<br>10<br>30 | 1<br>4 | 20<br>80 | 130 | 145 | 3 | [a] monoaxial<br>[b] biaxial<br>[c] monoaxial | 5/8 | 40 | 10<br>40<br>30 |
| Production Example 12 | 1<br>3 | 45<br>55 | 1<br>2<br>3 | 45<br>10<br>45 | 1<br>3 | 40<br>60 | 130 | 145 | 3 | [a] monoaxial<br>[b] biaxial<br>[c] monoaxial | 5/8 | 40 | 10<br>20<br>10 |
| Production Example 13 | Example 8 in JP-A 10-212367 | | | | | | 135 | 155 | 3 | [a] monoaxial<br>[b] biaxial<br>[c] monoaxial | 5/8 | 40 | 20<br>60<br>20 |
| Production Example 14 | 1<br>3 | 45<br>55 | 1<br>2<br>3 | 81<br>10<br>9 | 1<br>4 | 40<br>60 | 130 | 145 | 3 | [a] monoaxial<br>[b] biaxial<br>[c] monoaxial | 5/8 | 40 | 10<br>45<br>15 |
| Production Example 15 | 1<br>3 | 45<br>55 | 1<br>2<br>3 | 38<br>10<br>52 | 1<br>4 | 40<br>60 | 130 | 145 | 3 | [a] monoaxial<br>[b] biaxial<br>[c] monoaxial | 5/8 | 40 | 10<br>45<br>15 |

Test Example

The stretched thermoplastic resin films obtained in Production Examples 1 to 15 were evaluated according to the tests mentioned below. The results are shown in Table 3.

[Water Absorption Level]

Using a Cobb sizer (by Kumagai Riki Kogyo) according to a Cobb method (JIS-P-8140), the water absorption level of the surface of the water-based adhesive-receiving layer (c) of the stretched thermoplastic resin film produced was determined. The contact time was 120 seconds. The data of three test pieces were averaged.
 ●: from 10 ml/m² to 25 ml/m²
 ○: from 2 ml/m² to less than 10 ml/m²
 ×: less than 2 ml/m² or more than 25 ml/m²

[Water Vapor Permeability]

According to a cup method (JIS-Z-0208), the water vapor permeability of the stretched thermoplastic resin film produced was determined as follows: A moisture absorbent, calcium chloride was put into a water vapor permeability cup, and this was capped with the stretched resin film and sealed up with bees wax. Then, this was left in a constant-temperature constant-humidity tank at a temperature of 40° C. and a relative humidity of 90%, taken out at regular intervals of 24 hours, and the moisture permeability of each sample was measured. The data of three test pieces were averaged.
 ○: from 0 to 10 g/m²/24 hrs
 ×: more than 10 g/m²/24 hrs

[Porosity]

The stretched thermoplastic resin film produced was cut to prepare a sample piece having a cut face parallel to the thickness direction of the film and perpendicular to the surface direction thereof. The cut face was metallized, and then observed at a desired enlarged magnification power (for example, 500-power to 2000-power) with a scanning electronic microscope. Further, the pore part was traced on a tracing film and stained, and the thus-processed image was analyzed with an image analyzer (Nireco's Luzex IID Model) to determine the areal ratio (%) of the pores seen in the analyzed region. This is the porosity (%) of the film. The porosity (%) of the substrate layer (b) was also determined according to the above method. The data of three test pieces were averaged to be the porosity.

[Bendability]

The stretched thermoplastic resin film produced was cut to prepare a sample piece of 10 cm×10 cm, this was folded in two (in parallel to MD (film-traveling direction) and TD (perpendicular to MD)) and kept under a load of 1 kg applied thereto for 30 seconds. Immediately, the time taken before the test piece opened to have an opening angle of 0° to 120° was measured. The data of three test pieces were averaged to be the time taken in the test.
 ○: from 20 to 70 seconds
 ×: less than 20 seconds, or more than 70 seconds

[Surface Strength of Adhering Surface]

An adhesive tape (Nichiban's trade name, Cellotape®, Code "CT-18") was stuck to the surface of the water-based adhesive-receiving layer (c) of the stretched thermoplastic resin film produced. According to the method described in JAPAN TAPPI No. 18-2, the adhesive tape was peeled away using Internal Bond Tester (by Kumagai Riki Kogyo), whereupon the peeling strength (kg-cm) was measured. The measured strength and the practicability of the film were evaluated according to the standards mentioned below. The data of three test pieces were averaged to be the surface strength.
 ○: from 0.8 to 2.0 kg-cm
 ×: less than 0.8 kg-cm, or more than 2.0 kg-cm

TABLE 3

| | | Water Absorption Level (ml/m²) | | Water Vapor Permeability (g/m²/24 h) | | Overall Porosity (%) | Porosity of Substrate Layer [b] (%) | Bendability (time for 120-degree opening) (bending repulsion) MD/TD (sec) | | | | Surface Strength of Adhering Surface (Kg-cm) | |
|---|---|---|---|---|---|---|---|---|---|---|---|---|---|
| Example 1 | Production Example 1 | 5 | ○ | 4.0 | ○ | 21 | 23 | ○ | 21/35 | ○ | | 1.5 | ○ |
| Example 2 | Production Example 2 | 10 | ⊙ | 4.8 | ○ | 48.5 | 38 | ○ | 33/34 | ○ | | 0.9 | ○ |
| Example 3 | Production Example 3 | 7 | ○ | 7.5 | ○ | 31 | 38 | ○ | 41/39 | ○ | | 1.0 | ○ |
| Example 4 | Production Example 4 | 15 | ⊙ | 4.8 | ○ | 34 | 38 | ○ | 28/23 | ○ | | 1.0 | ○ |
| Example 5 | Production Example 5 | 10 | ⊙ | 4.5 | ○ | 36 | 38 | ○ | 25/22 | ○ | | 1.0 | ○ |
| Example 6 | Production Example 6 | 10 | ⊙ | 9.5 | ○ | 45 | 47 | ○ | 38/30 | ○ | | 1.0 | ○ |
| Example 7 | Production Example 7 | 10 | ⊙ | 3.8 | ○ | 24 | 21 | ○ | 22/21 | ○ | | 1.0 | ○ |
| Example 8 | Production Example 8 | 24 | ⊙ | 7.5 | ○ | 41 | 38 | ○ | 30/28 | ○ | | 0.9 | ○ |
| Comparative Example 1 | Production Example 9 | 0 | X | 2.8 | ○ | 0 | 0 | ○ | 34/33 | ○ | | 3.0 | X |
| Comparative Example 2 | Production Example 10 | 1 | X | 4.0 | ○ | 36 | 38 | ○ | 29/32 | ○ | | 1.2 | ○ |
| Comparative Example 3 | Production Example 11 | 30 | X | 8.0 | ○ | 56 | 38 | X | 88/75 | X | | 0.6 | X |
| Comparative Example 4 | Production Example 12 | 1 | X | 15.0 | X | 45 | 47 | ○ | 55/67 | ○ | | 1.0 | ○ |
| Comparative Example 5 | Production Example 13 | 15 | ⊙ | 3.5 | ○ | 18 | 38 | X | 15/18 | X | | 0.9 | ○ |
| Comparative Example 6 | Production Example 14 | 15 | ⊙ | 3.2 | ○ | 17 | 14 | X | 16/14 | X | | 1.0 | ○ |
| Comparative Example 7 | Production Example 15 | 15 | ⊙ | 15.0 | X | 52 | 55 | X | 71/73 | X | | 1.0 | ○ |

Examples 1 to 8 and Comparative Examples 1 to 7

A paper seal (102 mm×170 mm) was cut out of the stretched thermoplastic resin film obtained in Production Examples 1 to 15. A water-based adhesive (Koizumi Trading's Fujiat AL-8) was applied to the four sides of the water-based adhesive-receiving layer (c) of the paper seal, linearly in a width of 15 mm. The test piece was stuck to a carton container with a moisture-absorbing material, powder detergent (P&G's trade name, "Bold") put therein, the tested for practicability in the manner mentioned below. The results are shown in Table 4.

Test Example for Practicability

[Initial Adhesion Strength]

The initial adhesion power of the stretched thermoplastic resin film produced was measured using an adhesion power tester (JT Tohsi's trade name, "ASM-01"). Two test pieces of the stretched resin film (width 40 mm) were prepared. The water-based adhesive was applied to one test piece, left as such for 1 seconds, and then this was stuck to the other test piece under pressure for 1 second. Further after 1 second, this was tested for the shearing force in a tensile test (pulling speed: 300 mm/min), in which the maximum load was recorded. The data of three test pieces were averaged to be the value of the sample.

● : from 400 g to 600 g
○ : from 200 g to less than 400 g
×: less than 200 g, or more than 600 g

[Powder Leakage]

The paper seal produced in Examples and Comparative Examples was stuck to a carton container, and after 20 seconds, the container was laid on its side and checked for the detergent powder leakage, if any, from it.

○: No powder leakage in 3 trials.
×: At least one powder leakage in 3 trials.

[Adhesion Condition]

The paper seal produced in Examples and Comparative Examples was stuck to a carton container, and after 20 seconds, this was checked for the adhesion condition.

○: No edge swelling in 3 trials.
×: At least one edge swelling in 3 trials.

[Peelability]

The paper seal produced in Examples and Comparative Examples was, after the water-based adhesive was completely dried, peeled away, and checked for the peeling failure, if any, of the substrate in the adhering part. Based on the following standards, the adhering area was visually checked.

○: In 3 trials, the paper seal completely peeled away every time.

×: At least once in 3 trials, the carton container had material fracture seen in its cross section, and the substrate remained therein.

[Moisture-Proofness for Detergent]

The paper seal produced in Examples and Comparative Examples was stuck to a carton container, and after the water-based adhesive was completely dried, the container was stored in an environment at a temperature of 40° C. and a relative humidity of 80% for 3 days, and then the paper seal was peeled away and the powder detergent was checked for the condition.

○: No powder detergent aggregation in all the three samples tested.

×: Powder detergent aggregation was seen in at least one of the three samples.

TABLE 4

| | | Initial Adhesion Strength (g/cm) | Powder Leakage | Adhesion Condition | Peelability | Moisture-proofness for Detergent |
|---|---|---|---|---|---|---|
| Example 1 | Production Example 1 | 240 | ○ | ○ | ○ | ○ | ○ |
| Example 2 | Production Example 2 | 300 | ○ | ○ | ○ | ○ | ○ |
| Example 3 | Production Example 3 | 280 | ○ | ○ | ○ | ○ | ○ |
| Example 4 | Production Example 4 | 310 | ○ | ○ | ○ | ○ | ○ |
| Example 5 | Production Example 5 | 280 | ○ | ○ | ○ | ○ | ○ |
| Example 6 | Production Example 6 | 280 | ○ | ○ | ○ | ○ | ○ |
| Example 7 | Production Example 7 | 280 | ○ | ○ | ○ | ○ | ○ |
| Example 8 | Production Example 8 | 580 | ⊙ | ○ | ○ | ○ | ○ |
| Comparative Example 1 | Production Example 9 | 60 | X | X | ○ | ○ | ○ |
| Comparative Example 2 | Production Example 10 | 110 | X | X | ○ | ○ | ○ |
| Comparative Example 3 | Production Example 11 | 180 | X | X | X | X | ○ |
| Comparative Example 4 | Production Example 12 | 120 | X | X | ○ | ○ | X |
| Comparative Example 5 | Production Example 13 | 390 | ○ | ○ | X | ○ | ○ |
| Comparative Example 6 | Production Example 14 | 310 | ○ | ○ | X | ○ | ○ |
| Comparative Example 7 | Production Example 15 | 310 | ○ | ○ | X | ○ | X |

INDUSTRIAL APPLICABILITY

Not influenced by environmental factors such as humidity change, the paper seal of the invention does neither curl nor deform; and taking advantage of already-existing water-based adhesive (glue paste) systems, it may be readily stuck. In addition, the paper seal of the invention prevents the contents from absorbing moisture; and after stuck to a container, it can be peeled away not remaining on the container surface. Accordingly, when the paper seal of the invention is used, the yield in production of detergent containers may be increased, and during storage, the contents may be protected from moisture, and in use, there occurs little trouble; and the paper seal is extremely useful.

The invention claimed is:

1. A paper seal comprising a stretched thermoplastic resin film that comprises (a) a surface layer, (b) a substrate layer, and (c) a water-based adhesive-receiving layer having a water absorption level of from 2 to 25 ml/m$^2$, wherein the stretched thermoplastic resin film has a porosity of from 20 to 50% and a 120°-opening time by bending repulsion of from 20 to 70 seconds, wherein the surface layer (a) comprises from 20 to 100% by weight of a thermoplastic resin (A), the substrate layer (b) comprises from 20 to 80% by weight of a thermoplastic resin (A) and from 80 to 20% by weight of at least one of an inorganic fine powder (B) and an organic filler (B'), and the water-based adhesive-receiving layer (c) comprises from 25 to 50% by weight of a thermoplastic resin (A) and from 75 to 50% by weight of an inorganic fine powder (B), wherein the inorganic fine powder (B) in the water-based adhesive-receiving layer (c) is hydrophilicated with a surface-treating agent (C), and wherein the thermoplastic resin (A) has a degree of crystallinity of from 35% to 75%.

2. The paper seal according to claim 1, wherein the stretched thermoplastic resin film has a water vapor permeability of from 0 to 10 g/m$^{2/24}$ hrs.

3. The paper seal according to claim 1, wherein the substrate layer (b) has a porosity of from 20 to 50%.

4. The paper seal according to claim 1, wherein the water-based adhesive-receiving layer (c) has a surface strength of from 0.8 to 2.0 kg-cm and an initial adhesion power of from 200 to 600 g.

5. A method for sealing an article, comprising sticking the paper seal of claim 1 to an opening of an article with a water-based adhesive.

6. A sealed article, of which an opening is sealed up with the paper seal of claim 1 by a water-based adhesive.

7. The sealed article according to claim 6, wherein the opening is formed of paper.

8. The sealed article according to claim 6, wherein the opening is formed of carton paper.

9. The sealed article according to claim 6, wherein the article is a container containing a moisture-absorbing material.

10. The sealed article according to claim 9, wherein the moisture-absorbing material is a powder detergent.

* * * * *